US008552905B2

(12) United States Patent
Jin et al.

(10) Patent No.: US 8,552,905 B2
(45) Date of Patent: Oct. 8, 2013

(54) AUTOMATED LAYOUT OF BEAMS

(75) Inventors: Michael Y. Jin, San Gabriel, CA (US);
Eric N. Boe, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 336 days.

(21) Appl. No.: 13/034,995

(22) Filed: Feb. 25, 2011

(65) Prior Publication Data

US 2012/0268318 A1     Oct. 25, 2012

(51) Int. Cl.
*G01S 13/00*     (2006.01)
(52) U.S. Cl.
USPC .............................. 342/73; 342/25 R; 342/81
(58) Field of Classification Search
USPC .......................................... 342/25 R, 73, 81
See application file for complete search history.

(56) References Cited

U.S. PATENT DOCUMENTS

| 5,557,397 A | 9/1996 | Hyde et al. |
| 5,894,323 A | 4/1999 | Kain et al. |
| 5,986,604 A | 11/1999 | Nichols et al. |
| 6,205,400 B1 | 3/2001 | Lin |
| 7,212,938 B2 | 5/2007 | Mai |
| 7,340,344 B2 | 3/2008 | Chappell |
| 7,365,544 B2 | 4/2008 | McCracken et al. |
| 7,420,504 B1 | 9/2008 | Held et al. |
| 7,558,678 B2 | 7/2009 | Jones |
| 2004/0021600 A1* | 2/2004 | Wittenberg ................... 342/190 |

* cited by examiner

*Primary Examiner* — Timothy A Brainard
(74) *Attorney, Agent, or Firm* — Pierce Atwood LLP; Joseph M. Maraia

(57) ABSTRACT

The technology described herein includes a system and/or a method of automated layout of beams. The method includes generating a plurality of boundary positions along boundaries of an image frame. The method further includes determining a start location for a first beam within the plurality of boundary positions based on at least one of a mapping priority, direction of movement of a beam platform, and speed of movement of the beam platform. The method further includes modifying the plurality of boundary positions based on the start location. The method further includes determining a second location for a second beam within the modified plurality of boundary positions based on at least one of a mapping priority, direction of movement of a beam platform, and speed of movement of the beam platform. The method further includes modifying the modified plurality of boundary positions based on the second location.

14 Claims, 9 Drawing Sheets

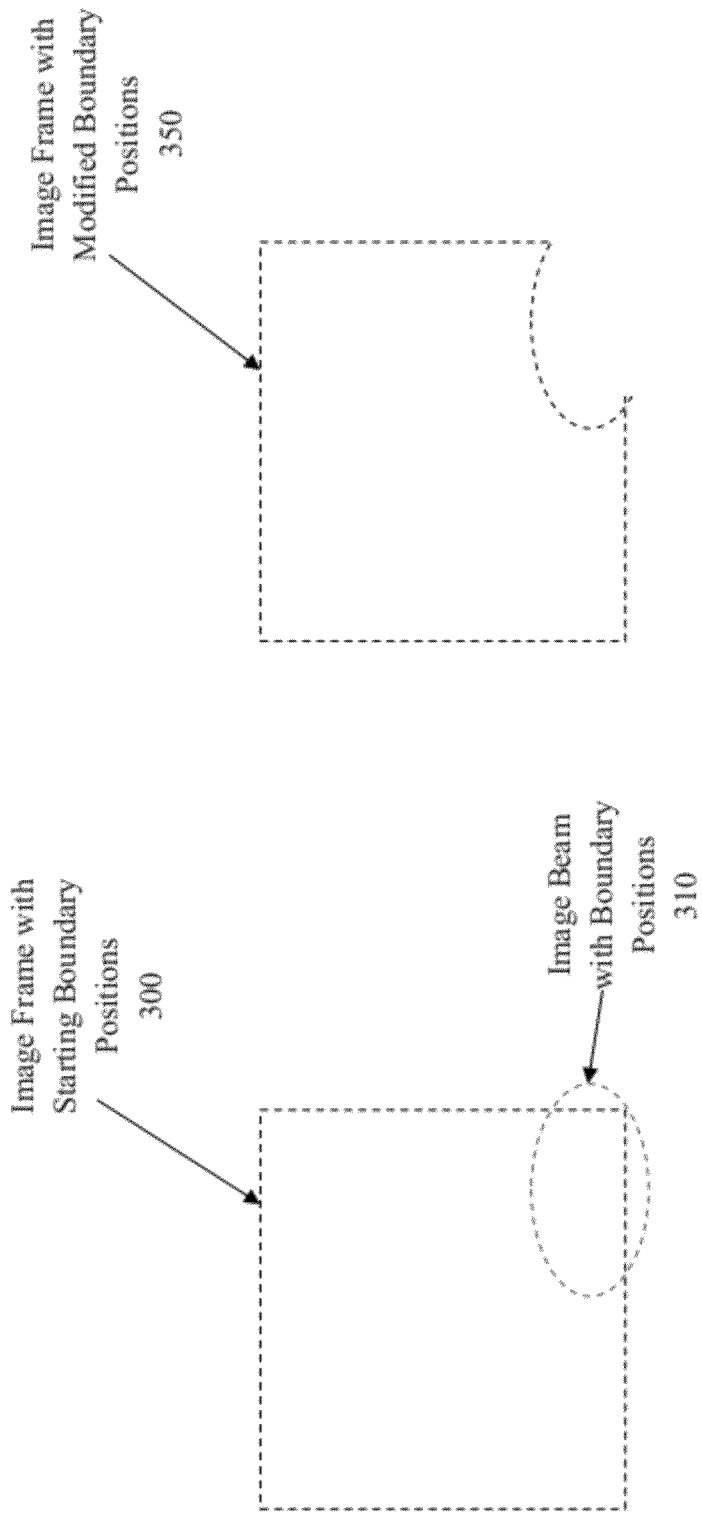

AUTOMATED LAYOUT OF BEAMS

GOVERNMENT SUPPORT

The U.S. Government may have certain rights in this invention as provided for by the terms of Contract No. (classified) awarded by (classified).

BACKGROUND

Previous attempts at beam layout include strip mode synthetic aperture radar (SAR) and scan mode SAR. In strip mode SAR, the radar device maintains a fixed pointing direction with respect to its heading direction. The area mapped by strip mode SAR is the product of the ground range swath of the radar beam and the along-track distance traveled by the beam platform (e.g., aircraft, spacecraft, etc.) over the mapping interval. Strip mode SAR is generally not efficient due to the constraints of aircraft speed, the extra radar range or Doppler bandwidth required at large squint angles to achieve equal resolution along each dimension (range/azimuth or along/cross track), and the lack of flexibility to follow area priority. In a scan mode SAR, the radar pointing direction is controlled to drift slowly along a straight line on the ground. However, this drift rate is constrained by the image resolution and the tolerable level of azimuth ambiguity. Scan mode SAR is generally not efficient due to the extra radar range or Doppler bandwidth required at large squint angles to achieve equal resolution along each dimension (range/azimuth or along/cross track) and the lack of flexibility to follow area priority. Thus, a need exists in the art for improved automated layout of beams.

SUMMARY

One approach provides a system for automated layout of beams. The system includes a boundary position module configured to generate a plurality of boundary positions along boundaries of an image frame and modify the plurality of boundary positions based on a plurality of beam locations. The system further includes a beam location module configured to determine the plurality of beam locations based on the plurality of boundary positions and at least one of a mapping priority, direction of movement of a beam platform, and speed of movement of the beam platform, each of the plurality of beam locations within the boundaries of the image frame.

Another approach provides a method for automated layout of beams. The method includes (a) generating a plurality of boundary positions along boundaries of an image frame; (b) determining a start location for a first beam within the plurality of boundary positions based on at least one of a mapping priority, direction of movement of a beam platform, and speed of movement of the beam platform; (c) modifying the plurality of boundary positions based on the start location; (d) determining a second location for a second beam within the modified plurality of boundary positions based on at least one of a mapping priority, direction of movement of a beam platform, and speed of movement of the beam platform; and (e) modifying the modified plurality of boundary positions based on the second location.

Another approach provides a computer program product. The computer program product is tangibly embodied in an information carrier. The computer program product includes instructions being operable to cause a data processing apparatus to generate a plurality of boundary positions along boundaries of an image frame; determine a start location for a first beam within the plurality of boundary positions based on at least one of a mapping priority, direction of movement of a beam platform, and speed of movement of the beam platform; modify the plurality of boundary positions based on the start location; determine a second location for a second beam within the modified plurality of boundary positions based on at least one of a mapping priority, direction of movement of a beam platform, and speed of movement of the beam platform; and modify the modified plurality of boundary positions based on the second location.

In other examples, any of the approaches above can include one or more of the following features.

In some examples, the system further includes a ground coordinate conversion module configured to convert the starting position into ground coordinates, the ground coordinates indicative of ground relative to a location of an image beam device; and a communication module configured to transmit the ground coordinates to the image beam device and receive an image beam from the image beam device.

In other examples, the system further includes a mapping priority module configured to determine the mapping priority based on at least one of beam size, beam resolution, ground overlap between the boundaries of the image frame and the start location, unspoiled beam size, and spoiled beam size.

In some examples, the system further includes a mapping priority module configured to determine the mapping priority based on at least one of minimum mapping time, minimum beam layout, highest beam utility, and highest probability of detection.

In other examples, the beam platform is an aircraft or a spacecraft. In some examples, each of the plurality of beam locations is a spotlight mode synthetic aperture radar beam.

In other examples, the method further includes (f) determining if the modified plurality of boundary positions define boundaries of the image frame; and (g) repeating steps (d), (e), and (f) based on the determination of step (f).

In some examples, the method further includes (f) determining if a target is detected within at least one of the start location and the second location; and (g) repeating steps (d), (e), and (f) based on the determination of step (f).

In other examples, the method further includes converting the starting position into ground coordinates, the ground coordinates indicative of ground relative to a location of an image beam device; transmitting the ground coordinates to the image beam device; and receiving an image beam from the image beam device.

In some examples, the method further includes determining the mapping priority based on at least one of beam size, beam resolution, ground overlap between the boundaries of the image frame and the start location, unspoiled beam size, and spoiled beam size.

In other examples, the method further includes determining the mapping priority based on at least one of minimum mapping time, minimum beam layout, highest beam utility, and highest probability of detection.

The automated layout of beams techniques described herein can provide one or more of the following advantages. An advantage of the technology is that the priority of the area (image frame) can be input and/or automatically determined (e.g., by antenna scan angle limit, beam size, etc.), thereby decreasing the overall cost for imaging the area by prioritizing resources on higher priority parts of the area. Another advantage of the technology is that the priority of the area can be based on the beam spoiling for the area at close range and/or other parameters, thereby increasing the effective resource constraints associated with imaging the area and reducing the overall cost for imaging the area.

Another advantage of the technology is that the technology is adaptable for the beam platform (e.g., aircraft, spacecraft, train, vehicle, etc.) flight profile, thereby increasing the effective uses for the technology and reducing the cost to deploy the technology. Another advantage of the technology is that the technology is computationally efficient, thereby reducing the computational needs for the technology and decreasing the cost to use the technology.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 3A-3B are diagrams of exemplary image frames;

DETAILED DESCRIPTION

The automated layout of beams method and apparatus includes technology that, generally, scans an area (image frame) on the ground using an image beam device (e.g., a spotlight mode synthetic aperture radar (SAR), a camera, an image sensor, etc.) to achieve full area coverage, full image quality, and/or high efficiency. The technology utilizes a beam platform (e.g., aircraft, spacecraft, train, vehicle, etc.) to image the ground area using the beam device. The complete or partial image of the area can be formed by the mosaic of spotlight images of the beams.

As a general description of the process for laying down each beam, the technology can perform the following steps: (1) convert frame boundary points into antenna coordinate, (2) determine beam center coordinate and elliptical contour model, (3) determine which frame points are inside the beam and which beam points are inside the frame, (4) update the frame boundary points based on the output of (3), (5) convert frame boundary points back to ground coordinate, (6) update aircraft position and ground-to-antenna transformation matrix, and (7) repeat (1)~(6) for the next beam.

The technology can create boundary points for both the mapping area and the beams to maximize the area for mapping with a minimum number of unfilled holes, thereby advantageously increasing the efficiency of the technology. For example, the area is 10.0 kilometers by 10.0 kilometers square and the boundary points are on the outside of the square every 100 meters (in this example, 400 boundary point on the outside of the square). The technology can determine the beam pointing direction based on an area of higher priority and/or maximal area acquired (minimum overlap between beams), thereby decreasing the time for imaging the area. The technology determines the beam location using antenna coordinates with an analytical contour model, thereby enabling the technology to quickly and efficiently determine whether a frame boundary point is within a beam or not.

Figure 1:
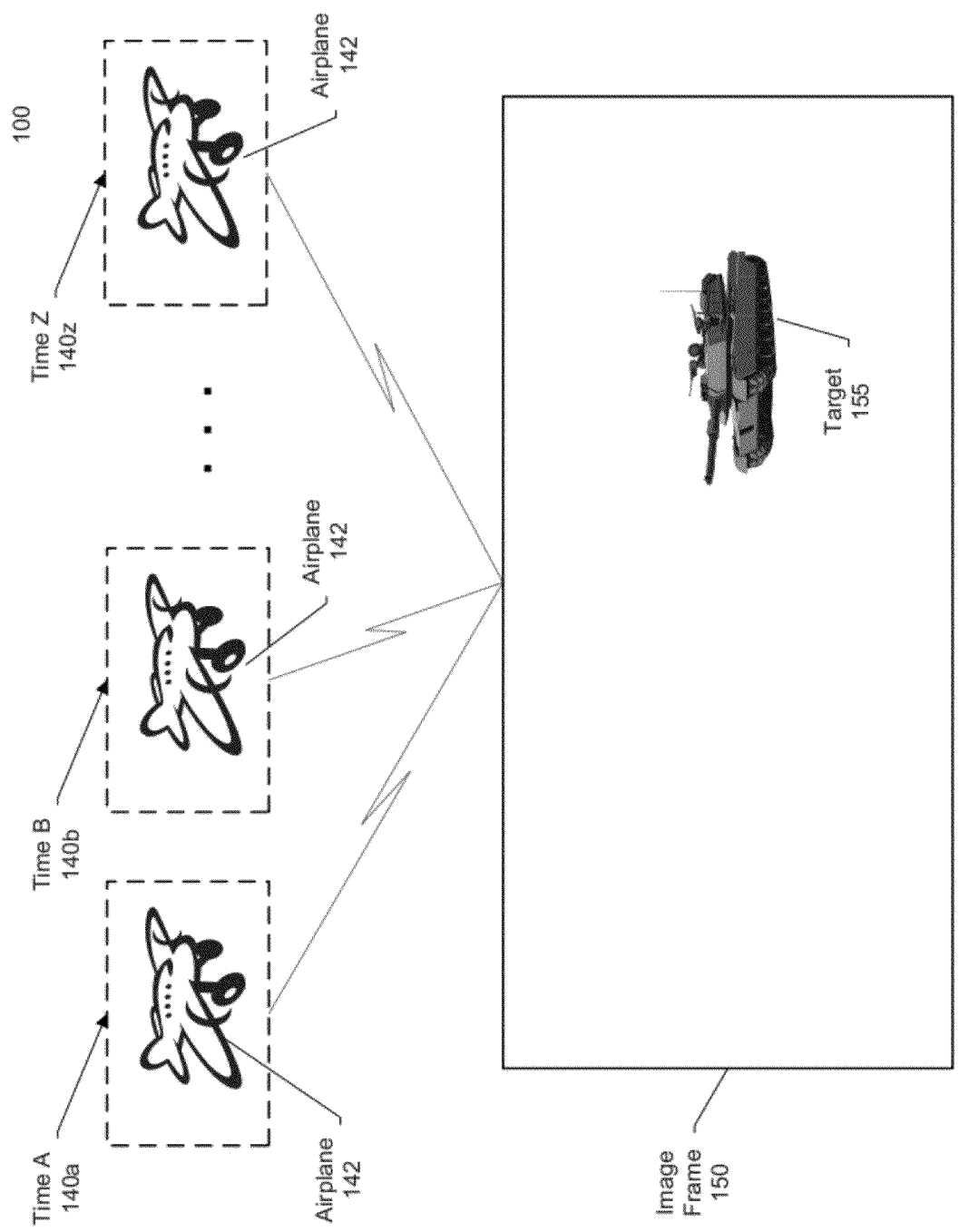
FIG. 1 is a diagram of an exemplary beam platform environment.

FIG. 1 is a diagram of an exemplary beam platform environment 100. The environment 100 includes an airplane 142 (beam platform). The airplane 142 images a target 155 (in this example, a tank) within an image frame 150 utilizing a beam device (not shown). The airplane 142 views and/or tracks the target 155 at a plurality of times A 140a, B 140b through Z 140z. The airplane 142 transmits and/or receives electromagnetic waves to image the target and/or a plurality of other targets (not shown). For example, the airplane 142 transmits electromagnetic waves over a period of time and receives the reflection of the electromagnetic waves from the target 155 over the plurality of times A 140a, B 140b through Z 140z. The beam device within the airplane 142 communicates data (e.g., digital representation of a radar reflection of the target 155, processed data representation of the target 155, etc.) to a beam layout system (not shown).

Although FIG. 1 illustrates the plurality of times A 140a, B 140b through Z 140z, the airplane 142 can utilize received data from any number of times for the imaging of targets. Although FIG. 1 illustrates an airplane 142, the environment 100 can utilize any number of beam platforms (e.g., ten airplanes, one hundred spacecrafts, etc.). For example, the airplane 142 can receive radar data from any number of airplanes for the same target or different targets. In other examples, the airplane 142 can include a plurality of radars, cameras, and/or other types of sensor devices (e.g., motion sensor, environmental sensor, heat sensor, etc.).

Figure 2A:
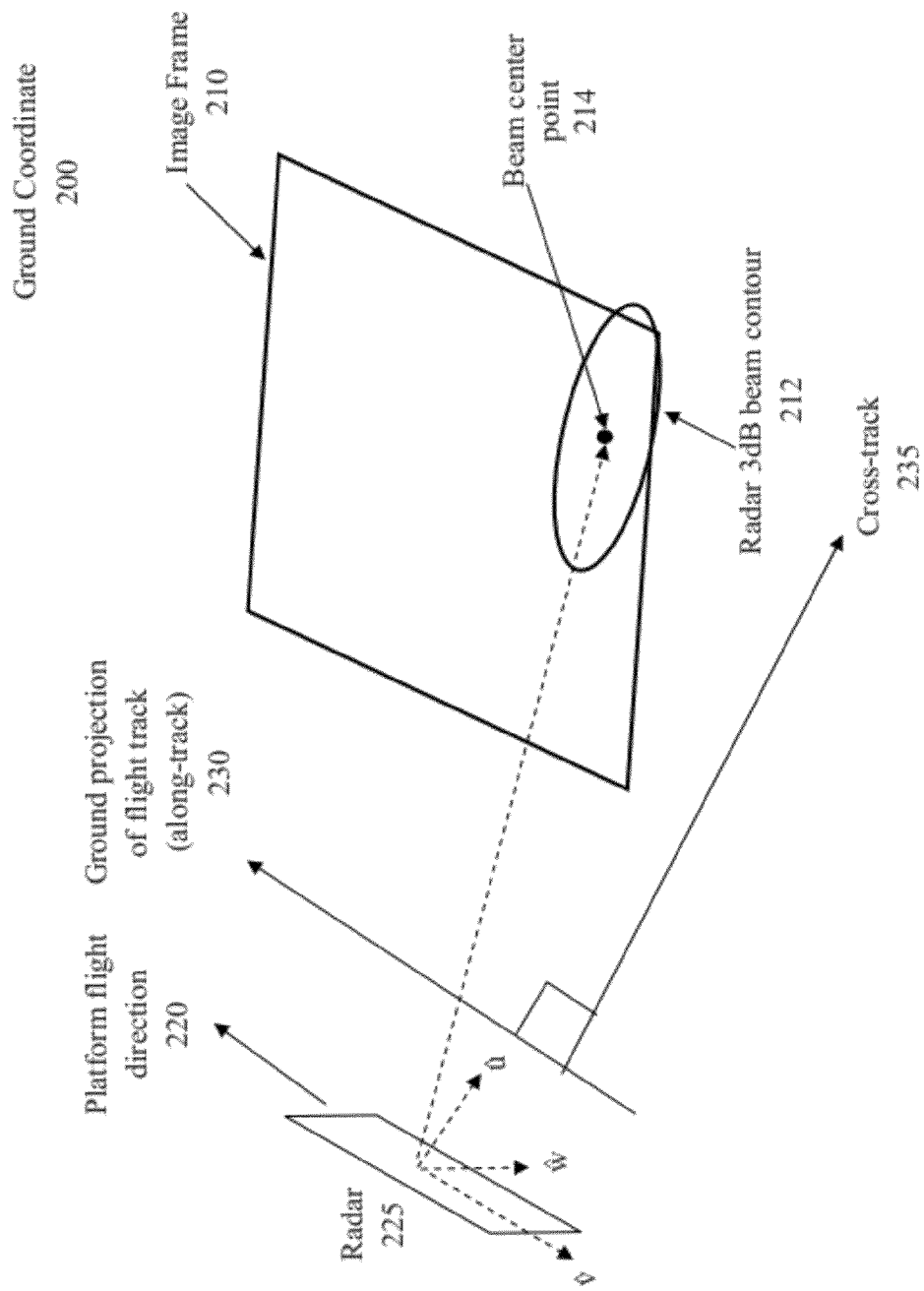
FIG. 2A is a diagram of exemplary ground coordinates.

FIG. 2A is a diagram of exemplary ground coordinates 200 for geometry of SAR spotlight mapping. The diagram illustrates a beam platform flight direction 220 which corresponds to a ground projection of a flight track 230 and a cross-track 235 for the beam platform. A radar 225 on the beam platform transmits and/or receives beams for mapping of an image frame 210 (ground area). The beam platform determines a beam center point 214 within the image frame 210 to project a radar 3 dB beam contour 212 (in this example, an ellipse). The radar 225 transmits pulses and receives radar returns from the pulses over a time interval (referred to as the synthetic aperture interval) to achieve the specified image resolution. During the time interval, the radar keeps the beam pointed at the same location on the ground.

Figure 2B:
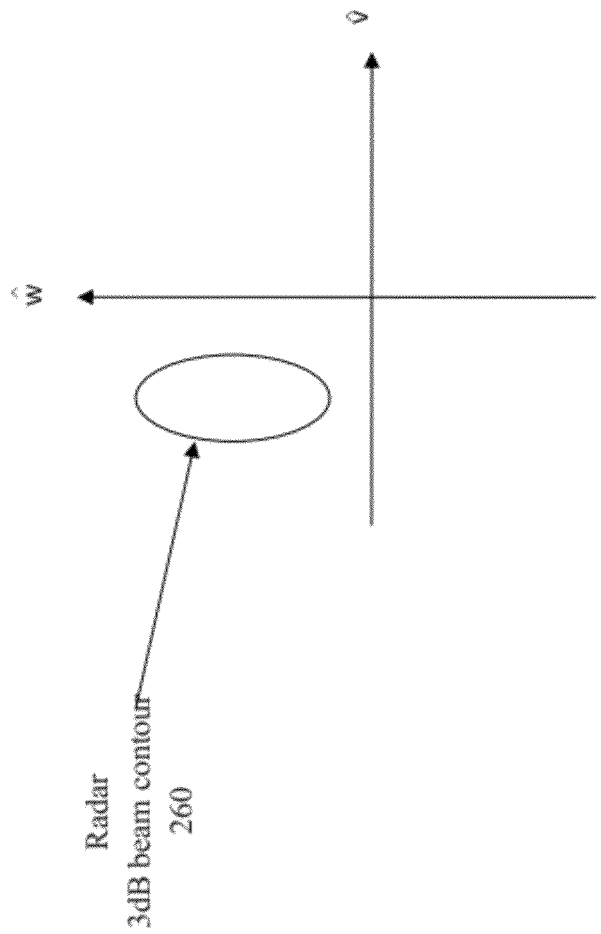
FIG. 2B is a diagram of exemplary antenna coordinates.

FIG. 2B is a diagram of exemplary antenna coordinates 250. The diagram illustrates a radar beam contour 260 within the antenna coordinate 250 as converted from the radar beam contour 212 of FIG. 2A within the ground coordinate 200.

FIG. 3A is a diagram of an exemplary image frame 300 with starting boundary positions (in this example, a square). As illustrated in FIG. 3A, a beam layout system (not shown) determines a location of an image beam 310 with boundary positions. FIG. 3B is a diagram of an exemplary modified image frame 350. The beam layout system modifies the image frame 300 with starting boundary positions to form the image frame 350 with modified boundary positions. The beam layout system can continue to determine locations of image beams and modify the image frame based on the locations of the image beams.

Figure 4A:
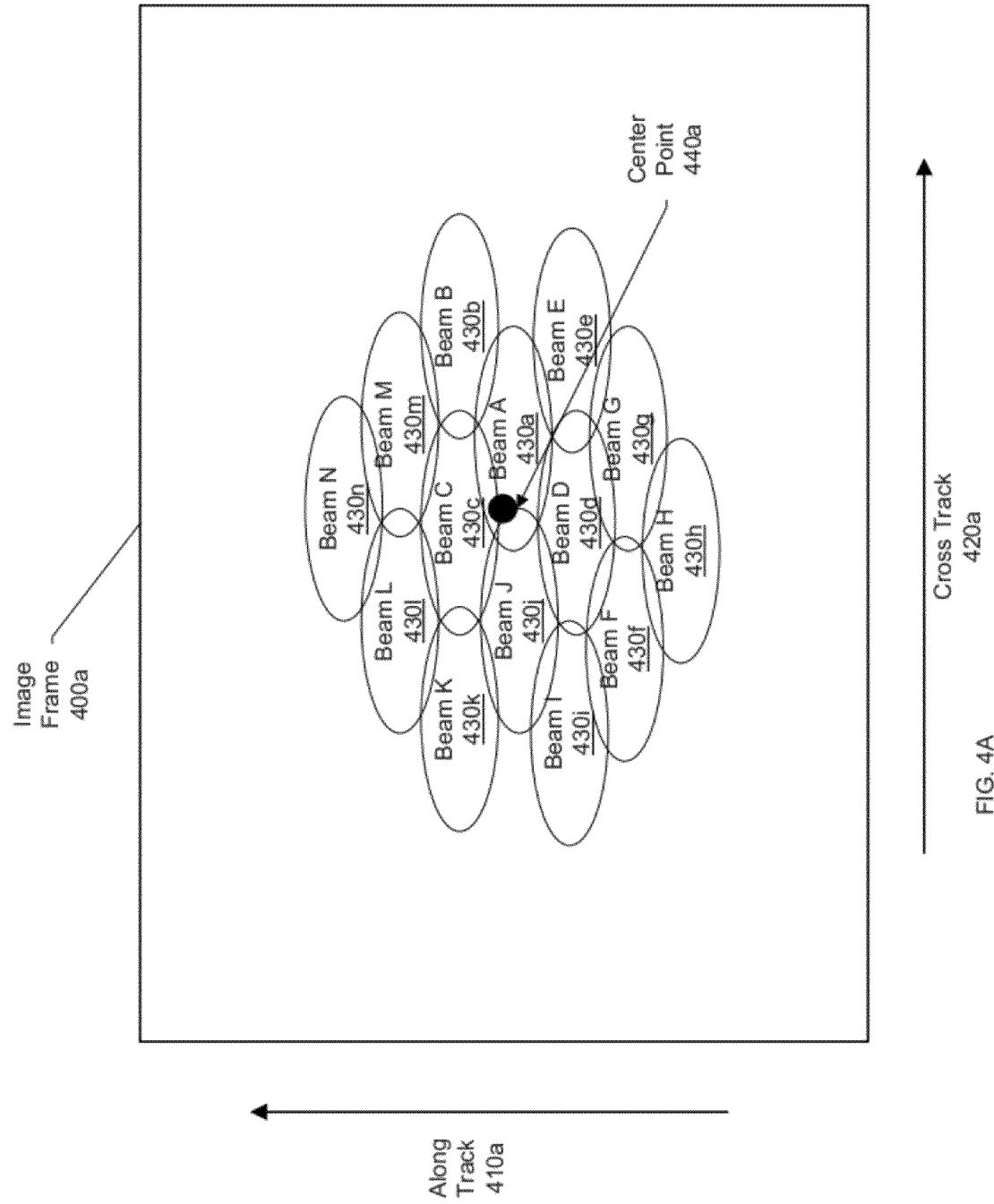
FIGS. 4A-4B are diagrams of exemplary beam layouts for an image frame.

FIG. 4A is a diagram of an exemplary beam layout for an image frame 400a. The beam layout is along a beam platform track 410a and along a beam platform cross track 420a. The beam layout includes a plurality of beams A 430a, B 430b, C 430c, D 430d, E 430e, F 430f, G 430g, H 430h, I 430i, J 430j, K 430k, L 430l, M 430m, and N 430n (generally referred to as beams 430). The beam layout system (not shown) determines a center point 440a within the image frame 400a based on one or more parameters (e.g., a mapping priority, direction of movement of a beam platform, speed of movement of the beam platform, etc.). The beam layout system determines the layout of the beams 430 based on one or more parameters (e.g., a mapping priority, direction of movement of a beam platform, speed of movement of the beam platform, etc.). Table 1 illustrates exemplary parameters associated with the beam locations.

TABLE 1

Exemplary Parameters

| Beam Location | Direction of Movement | Speed of Movement | Mapping Priority | Sequence |
|---|---|---|---|---|
| Beam A 430a | In-line with Center Point 440a | Over 200 miles per hour | Covers Center Point 440a | 1 |
| Beam B 430b | Past Center Point 440a | Over 200 miles per hour | Within 2 bands from Center Point 440a | 2 |
| Beam C 430c | Past Center Point 440a | Over 200 miles per hour | Within 1 band from Center Point 440a | 3 |

Figure 4B:
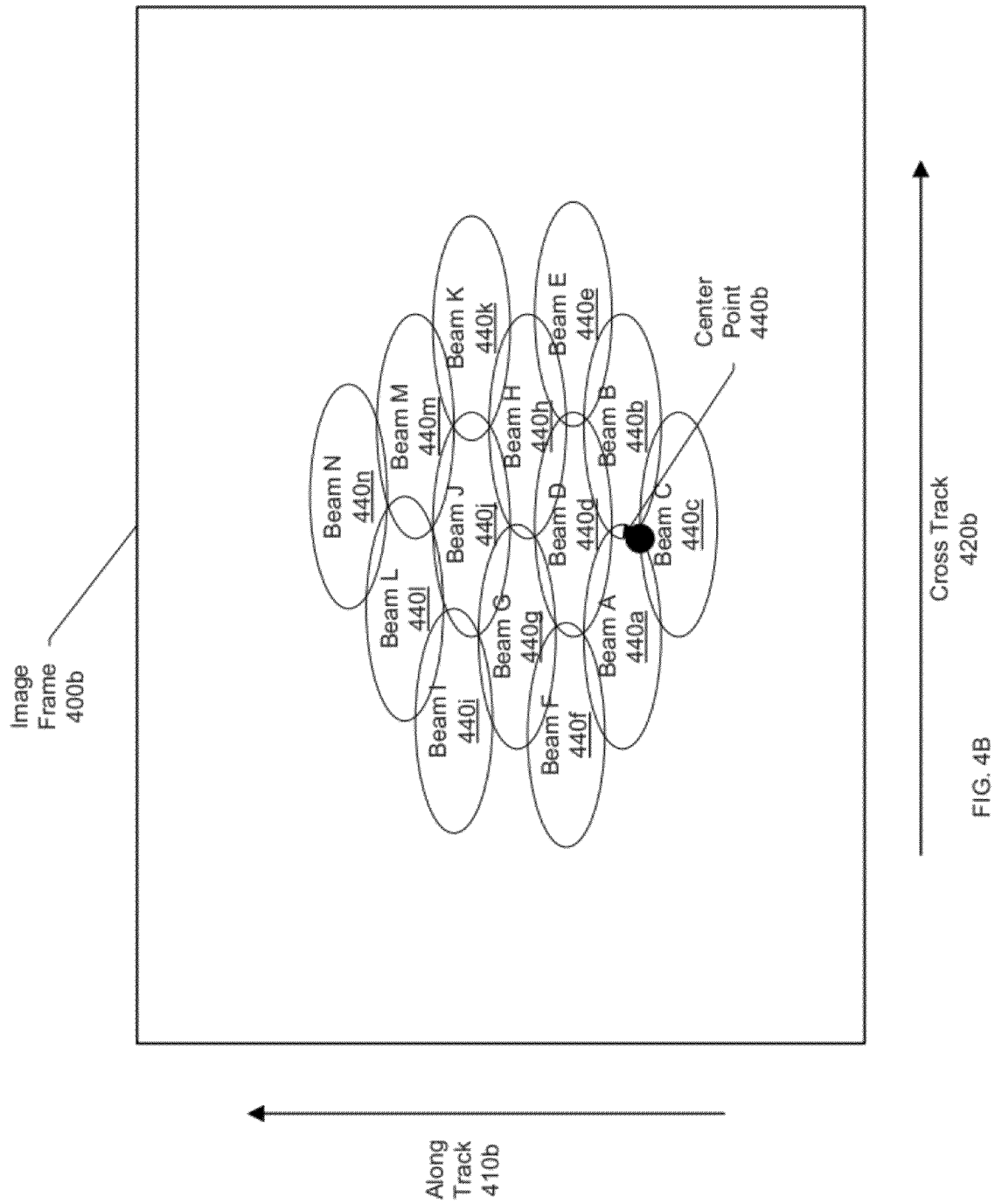

FIG. 4B is a diagram of an exemplary beam layout for an image frame 400b. The beam layout is along a beam device track 410b and along a beam device cross track 420b. The beam layout includes a plurality of beams A 440a, B 440b, C 440c, D 440d, E 440e, F 440f, G 440g, H 440h, I 440i, J 440j, K 440k, L 440l, M 440m, and N 440n (generally referred to as beams 440). The beam layout system (not shown) determines a center point 440b within the image frame 400b based on one or more parameters. The center point 440b can be indicative of a center of a geographic area, a location of a suspected target, a location of a known target, and/or any other location associated with the technology. The determination of the center point 440b advantageously enables the technology to maximize resource allocation while imaging more of the image frame. The beam layout system determines the layout of the beams 440 based on one or more parameters. The layout of the beams 440 based on the one or more parameters advantageously enables the technology to customize the beam layout based on real-world limitations while maximizing resource allocation.

Figure 5:
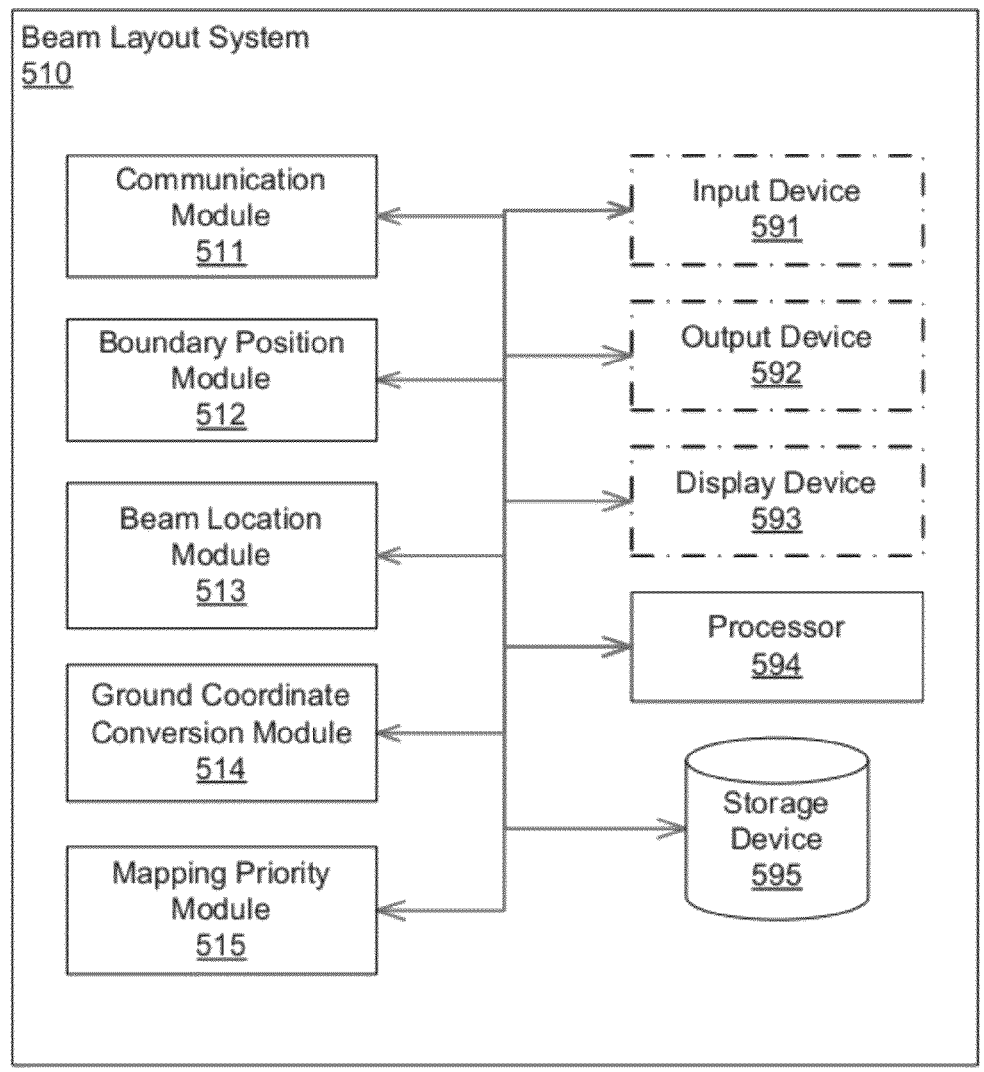
FIG. 5 is a block diagram of an exemplary beam layout system.

FIG. 5 is a block diagram of an exemplary beam layout system 510. The beam layout system 510 includes a communication module 511, a boundary position module 512, a beam location module 513, a ground coordinate conversion module 514, a mapping priority module 515, an input device 591, an output device 592, a display device 593, a processor 594, and a storage device 595. The modules and devices described herein can, for example, utilize the processor 594 to execute computer executable instructions and/or include a processor to execute computer executable instructions (e.g., an encryption processing unit, a field programmable gate array processing unit, etc.). It should be understood that the beam layout system 510 can include, for example, other modules, devices, and/or processors known in the art and/or varieties of the illustrated modules, devices, and/or processors.

The communication module 511 transmits the ground coordinates to the image beam device and receives an image beam from the image beam device. The communication module 511 receives the radar data (e.g., radar signal data, from a radar platform, from an intermediate radar processing device, from a storage device, etc.). The communication module 511 communicates information to/from the beam layout system 510. The communication module 511 can receive, for example, information associated with a radar platform. The information associated with the radar platform can be associated with a data signal (e.g., data signal from a radar platform, processed data signal from a radar platform, data signal from a motion sensor, data signal from a global positioning system, data signal from a location system, etc.).

The boundary position module 512 generates a plurality of boundary positions along boundaries of an image frame and modify the plurality of boundary positions based on a plurality of beam locations. The generation of the plurality of boundary positions advantageously reduces the resource requirements of the technology by tracking the image frame utilizing location coordinates for the image area that needs to be imaged. The beam location module 513 determines the plurality of beam locations based on the plurality of boundary positions and at least one of a mapping priority, direction of movement of a beam platform, and speed of movement of the beam platform, each of the plurality of beam locations within the boundaries of the image frame. The determination of the plurality of beam locations advantageously maximizes the image frame that is imaged by utilizing the one or more parameters. The ground coordinate conversion module 514 converts the starting position into ground coordinates, the ground coordinates indicative of ground relative to a location of an image beam device.

The mapping priority module 515 determines the mapping priority based on at least one of beam size, beam resolution, ground overlap between the boundaries of the image frame and the start location, unspoiled beam size, and spoiled beam size. In other examples, the mapping priority module 515 determines the mapping priority based on at least one of minimum mapping time, minimum beam layout, highest beam utility, and highest probability of detection. The determination of the mapping priority advantageously enables the technology to increase the quantity and/or quality of the imaged area by focusing resources on priority areas of the image frame.

The input device 591 receives information associated with the beam layout system 510 (e.g., instructions from a user, instructions from another computing device, etc.) from a user (not shown) and/or another computing system (not shown). The input device 591 can include, for example, a keyboard, a scanner, etc. The output device 592 outputs information associated with the beam layout system 510 (e.g., information to a printer (not shown), information to a speaker, etc.).

The display device 593 displays information associated with the beam layout system 510 (e.g., status information, configuration information, etc.). In some examples, the display device 593 displays the probability of identification of the classification of the object and/or any other information associated with the beam layout system 510 to an operator. The processor 594 executes the operating system and/or any other computer executable instructions for the beam layout system 510 (e.g., executes applications, etc.).

The storage device 595 stores the received data (e.g., actual radar data, processed radar data, etc.), the beam layout, and/or any other data associated with the beam layout system 510. The storage device 595 can store image information and/or any other data associated with the beam layout system 510. The storage device 595 can include a plurality of storage devices and/or the beam layout system 510 can include a plurality of storage devices (e.g., a radar storage device, an identification storage device, etc.). The storage device 595 can include, for example, long-term storage (e.g., a hard drive, a tape storage device, flash memory, etc.), short-term storage (e.g., a random access memory, a graphics memory, etc.), and/or any other type of computer readable storage.

Figure 6:
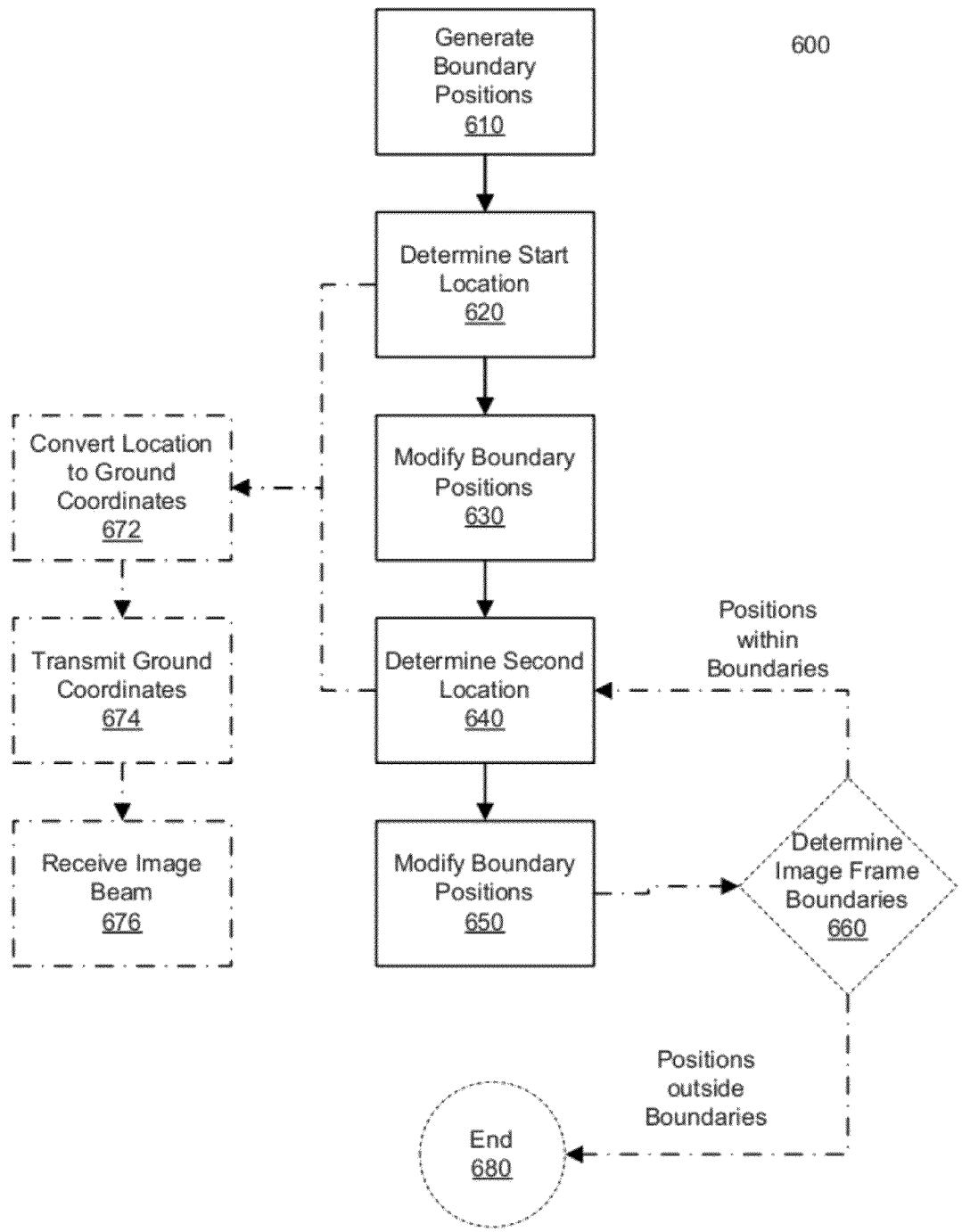
FIG. 6 is a flowchart of an exemplary beam layout process.

FIG. 6 is a flowchart of an exemplary beam layout process 600 utilizing, for example, the beam layout system 510 of FIG. 5. The boundary position module 512 generates (610) a plurality of boundary positions along boundaries of an image frame, thereby advantageously generating an easy to compute boundary for the area within the image frame left for imaging. The beam location module 513 determines (620) a start location for a first beam within the plurality of boundary positions based on at least one of a mapping priority, direction of movement of a beam platform, and speed of movement of the beam platform, thereby advantageously prioritizing the imaging to maximize resource allocation. The boundary position module 512 modifies (630) the plurality of boundary positions based on the start location. The beam location module 513 determines (640) a second location for a second beam within the modified plurality of boundary positions based on at least one of a mapping priority, direction of movement of a beam platform, and speed of movement of the beam platform. The determination of the locations based on the parameters enables the technology to customize the beam layout based on the actual constraints of the beam device and the beam platform. The boundary position module 512 modifies (650) the modified plurality of boundary positions based on the second location. The modification of the boundary positions enables the technology to efficiently determine another beam location through the use of computationally efficient boundary position indicators.

In some examples, the boundary position module 512 determines (660) if the modified plurality of boundary positions define boundaries of the image frame (in other words, is there any part of the image frame that is not covered by image beams). If the modified plurality of boundary positions are within the boundaries of the image frame, the processing continues by the beam location module 513 determines (640) another location for another beam within the modified plurality of boundary positions based on at least one of a mapping priority, direction of movement of a beam platform, and speed of movement of the beam platform. If the modified plurality of boundary positions are outside the boundaries of the image frame, the processing ends (680). The determination (640) by the beam location module 513 is advantageously an efficient computation due to the simplicity of the boundary position management of the image area which decreases the resources needed for the determination (640) and increases the speed of the image layout process.

In other examples, the ground coordinate conversion module 514 converts (672) the starting position into ground coordinates. The ground coordinates are indicative of ground relative to a location of an image beam device. The ground coordinate conversion module 514 transmits (674) the ground coordinates to the image beam device. The ground coordinate conversion module 514 receives (676) an image beam from the image beam device.

Figure 7:
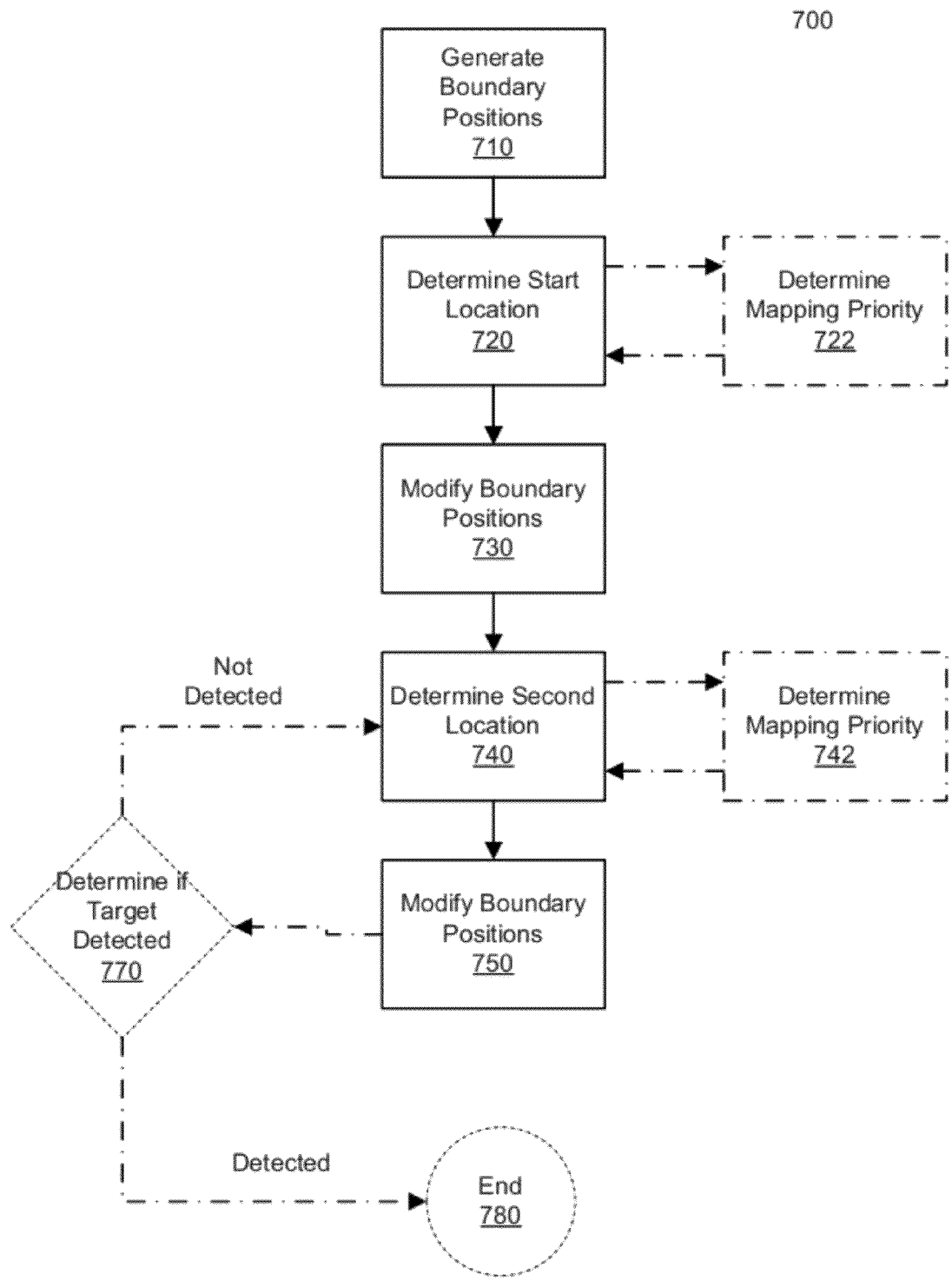
FIG. 7 is a flowchart of another exemplary beam layout process.

FIG. 7 is a flowchart of another exemplary beam layout process 700 utilizing, for example, the beam layout system 510 of FIG. 5. The boundary position module 512 generates (710) a plurality of boundary positions along boundaries of an image frame. The beam location module 513 determines (720) a start location for a first beam within the plurality of boundary positions based on at least one of a mapping priority, direction of movement of a beam platform, and speed of movement of the beam platform. The boundary position module 512 modifies (730) the plurality of boundary positions based on the start location. The beam location module 513 determines (740) a second location for a second beam within the modified plurality of boundary positions based on at least one of a mapping priority, direction of movement of a beam platform, and speed of movement of the beam platform. The boundary position module 512 modifies (750) the modified plurality of boundary positions based on the second location.

In some examples, the boundary position module 512 determines (770) if a target is detected within at least one of the start location, the second location, and/or any additional locations. The prioritization of the beam locations enables the technology to efficiently locate the target within the image frame, thereby advantageously reducing the time for target detection and reducing the cost for target detection. If the target is not detected, the processing continues by the beam location module 513 determines (740) another location for another beam within the modified plurality of boundary positions based on at least one of a mapping priority, direction of movement of a beam platform, and speed of movement of the beam platform. If the target is detected, the processing ends (780).

In other examples, the mapping priority module 515 determines (722 and/or 742) the mapping priority based on at least one of beam size, beam resolution, ground overlap between the boundaries of the image frame and the start location, unspoiled beam size, and spoiled beam size. In some examples, the mapping priority module 515 determines (722 and/or 742) the mapping priority based on at least one of minimum mapping time, minimum beam layout, highest beam utility, and highest probability of detection. In other examples, the mapping priority module 515 determines (722 and/or 742) the mapping priority based on any type parameter and/or combination of parameters (e.g., minimum mapping time and unspoiled beam size, beam resolution and highest probability of detection, etc.). In some examples, the mapping priority module 515 determines (722 and/or 742) the mapping priority based on prior knowledge of the image area, external clues, a probability distribution function, a geographic feature (e.g., road, building, etc.). The technology advantageously utilizes mapping priorities to maximize the use of the resources (e.g., aircraft, processors, memory, etc.) and/or time (e.g., aircraft flight time, time over image area, etc.), thereby reducing the overall cost of imaging an image frame. Table 2 illustrates exemplary mapping priorities. For example, as illustrated in Table 2, the beam A 430a has the highest priority because of the low mapping time and short distance to center point.

TABLE 2

Exemplary Mapping Priorities

| Beam Location | Minimum Mapping Time | Distance to Center Point | Priority Determination |
|---|---|---|---|
| Beam A 430a | 1.12 | 5.4 meters | 1 |
| Beam B 430b | 1.34 | 6.4 meters | 2 |
| Beam C 430c | 2.12 | 5.6 meters | 3 |

In some examples, the beam platform is an aircraft, a spacecraft, and/or any other type of moving platform (e.g., train, vehicle, etc.). In other examples, each of the plurality of beam locations is a spotlight mode synthetic aperture radar beam. In some examples, each of the plurality of beam locations is any type of beam (e.g., camera beam, infrared beam, etc.) and/or any combination of types of beams.

In other examples, the beam layout system determines a number of boundary points for the image area based on the size of the image area, beam size, antenna design, required density of boundary points, and/or any other information associated with the beam device and/or the image area. The variations in the number of boundary points advantageously enable the technology to adapt to various situations and physical constraints which increases the efficiency of the technology. In some examples, the beam layout system simulates the beam layout process to determine an optimal number of boundary points since too many boundary points can slow down the beam layout process and too few boundary points can cause parts of the image area to be missed.

For an exemplary quadrilateral mapping area, the frame boundary points are the union of four boundary lines of the frame. The beam layout system determines the coordinates by the frame center coordinate $a_{cnt\_FRM}$ and $c_{cnt\_FRM}$, the frame size in along-track $L_{AT\_FRM}$ and in cross-track $L_{CT\_FRM}$, the frame orientation angle $\theta_{FRM}$, and the number of frame points in one along-track boundary, $N_A$, and in one cross-track boundary, $N_C$. The total number of frame points are denoted as $N_T$, where $N_T = 2(N_A + N_C)$.

As a further example, the frame boundary point is the set of points with along-track coordinate of $at_{FRM}$ and cross-track coordinate of $ct_{FRM}$. The set is denoted as $\Omega_{FRM}$, where $\Omega_{FRM} = (at_{FRM}(k), ct_{FRM}(k))$, $k=1, \ldots, N_T$.

In other examples, the initial aircraft position is extracted from the aircraft information based on the planned mapping time of the first beam. The coordinate conversion between the ground coordinate in ACD (along-track, cross-track, and down direction) and the UVW antenna coordinate (antenna normal, long axis, and short axis) is determined based on the antenna mounting angles. If $T_{acd\_to\_uvw}$ represents the transformation for the ACD coordinate into the UVW coordinate. The transpose of $T_{acd\_to\_uvw}$ is the inverse coordinate transform $T_{uvw\_to\_acd}$. The antenna boresight vector in ground coordinates is given by $$T_{uvw\_to\_acd} \cdot \begin{bmatrix} 1 \\ 0 \\ 0 \end{bmatrix}.$$

The antenna coordinates of each frame point $e_{FRM}(k)$ is obtained based on the pointing vector of this frame point through a coordinate transformation, which is calculated in accordance with:

$e_{FRM}(k) = T_{acd\_to\_uvw} \cdot [\Delta at(k), \Delta ct(k), \Delta zt(k)]/\Delta r(k)$ for $k=1, 2, \ldots, N_T$, where $\Delta at(k) = at_{FRM}(k) - at_{AC}$ $\Delta ct(k) = ct_{FRM}(k) - ct_{AC}$ $\Delta zt(k) = h$ $\Delta r(k) = \sqrt{\Delta at(k)^2 + \Delta ct(k)^2 + \Delta zt(k)^2}$ and h is the aircraft altitude, $at_{AC}$ and $ct_{AC}$ are the aircraft along-track and cross-track coordinate, respectively.

In other examples, the beam layout system defines the priority of mapping for each frame point, thereby advantageously customizing the beam layout based on actual physical constraints of the image frame. A high priority point can be the frame with the longest slant range, the shortest slant range, maximum azimuth angle, minimum azimuth angle, and/or other measures. In this example, the mapping priority is placed upon the frame point with the maximum v value in the antenna coordinate. This prioritization enables the mapping to finish the part of the frame that is likely to be out of scan limit soon, thereby increasing the probability that the entire image frame is completely mapped down the flight path and reducing the potential cost of re-imaging an area. The process to get the frame point with the highest priority of mapping is to find the maximum of the v coordinate of all frame points, i.e., is in accordance with:

[v max, posv] = max($v_{FRM}(:)$) where $v_{FRM}(k) = e_{FRM}(k) \cdot [0\ 1\ 0]$, for $k=1, \ldots, N_T$ In other examples, the beam layout system determines the center point, thereby advantageously focusing the beam layout on higher priority parts of the image frame. The beam layout system can process/utilize the following steps to determine the center point.

(1) Find the fame points with v coordinate falling between v max and v max−vwid/2. This can be used to determine the search window in the w coordinate. The set of frame points satisfying $v_{FRM}(k, k \in \Omega_{FRM}) > $ v max−vwid/2 are denoted as $\Re$. vwid is the beam width along v direction.

(2) Determine the search window in the w coordinate, i.e. $\Delta w$, of all frame points from the previous step. $\Delta w$ is given by $\Delta w = \max(w_{FRM}(k, k \in \Re)) - \min(w_{FRM}(k, k \in \Re))$, where $w_{FRM}(k) = e_{FRM}(k) \cdot [0\ 0\ 1]$ (3) Determine all candidate w values of center points, i.e. $w_{cnt\_BM}(k) = \min(w_{FRM}(k', k' \in \Re)) + (k-1) \cdot dw$, where $k \in [1: n_{step}]$ and $dw = \Delta w / n_{step}$.

(4) For each $w_{cnt\_BM}(k)$ candidate, determine the corresponding v coordinate of beam centers, i.e. $v_{cnt\_BM}(k)$. The $v_{cnt\_BM}(k)$ is computed based on the maximum overlap between the beam and frame. The subset of frame point are referred to as $\Re_1$ and the frame points $k' \in \Omega_{FRM}$ are calculated in accordance with: $|w_{FRM}(k') - w_{cnt\_BM}(k)| < $ wwid/2 and $v_{FRM}(k') > v_{cnt\_BM}(k) - $ vwid/4. A beam contour can include the frame point if the beam center follows $v_{cnt}(k', k) = v_{FRM}(k') - $ vwid/2 · cos θ, where $$\theta = \cos^{-1}\left(\frac{w_{FRM}(k') - w_{center\_BM}}{wwid/2}\right)$$

and wwid is the beam width along w direction. Then, the v coordinate of the k-th beam's center is given by the maximum of $v_{cnt}(k', k)$ among all frame points k' in $\Re_1$, i.e. $v_{cnt\_BM}(k) = \max(v_{cnt}(k', k))$ (5) Determine the area cropped out of the frame by the beam centered at $v_{cnt\_BM}(k)$ and $w_{cnt\_BM}(k)$ and select the beam with the maximum area cropped out. The first step is to find all the frame points within each beam. $\Re_3(k)$ is the collection of frame points that are within beam k. The frame point in $\Re_3(k)$ is calculated in accordance with:

$$\sqrt{\Delta v^2 + \Delta w^2} < \sqrt{(vwid/2 \cdot \cos\theta(k', k))^2 + (wwid/2 \cdot \sin\theta(k', k))^2}$$

where $\theta(k', k) = \tan^{-1}(\Delta w / \Delta v \cdot vwid/2, wwid/2)$ and $\Delta v = v_{FRM}(k', k' \in \Omega_{FRM}) - V_{cnt\_BM}$ $\Delta w = w_{FRM}(k', k' \in \Omega_{FRM}) - W_{cnt\_BM}$ Then, find the v coordinate of a point on the left side (with lower v value) of the 3 dB beam contour with the same w of the frame point.

$v_{left\_BM}(k', k) = v_{cnt\_BM}(k) - |\cos(\sin^{-1}((w_{FRM}(k', k' \in \Re_3) - w_{cnt\_BM}(k))/(wwid/2))) \cdot (vwid/2)|$ The overlapped area of the k-th beam and the frame, also defined by the frame points in $\Re_3(k)$ and its corresponding beam point on the left side (with lower v value) of the 3 dB beam contour, can be approximated by $$A(k) = \frac{1}{N_{\Re_3}} \sum_{k'}^{k' \in \Re_3} \sqrt{\frac{(at_{FRM}(k',k) - at_{BM}(k',k))^2 +}{(ct_{FRM}(k',k) - ct_{BM}(k',k))^2}}$$

$$\left( \max_{k'}^{k' \in \Re_3} \left( \sqrt{at_{BM}(k',k)^2 + ct_{BM}(k',k)^2} \right) - \min_{k'}^{k' \in \Re_3} \left( \sqrt{at_{BM}(k',k)^2 + ct_{BM}(k',k)^2} \right) \right)$$

where $at_{FRM}(k',k)$ and $ct_{FRM}(k',k)$ are the ground coordinate of the point $(v_{FRM}(k',k), w_{FRM}(k',k))$ in antenna coordinate and $at_{BM}(k',k)$ and $ct_{BM}(k',k)$ are the ground coordinate of the point $(v_{left\_BM}(k',k), w_{FRM}(k',k))$ in antenna coordinate.

(6) The beam center position is the one with the maximum area found in the previous step as calculated in accordance with: $W_{cnt\_BM} = W_{cnt\_BM}(pos)$, $V_{cnt\_BM} = V_{cnt\_BM}(pos)$, where $[val, pos] = \max_{k=1}^{k=n_{step}}(A(k))$ for $k=1, \ldots, n_{step}$.

In other examples, the beam layout system detects frame points (boundary points) that are within the beam boundary. The points are removed from the existing set of the frame points. The beam layout system can process/utilize the following steps to detect frame points.

(1) For frame points with its v coordinate greater than $V_{cnt\_BM}$-vwid/2, the relative v and w are computed first, i.e.

$$\Delta v = v_{FRM}(k) - V_{cnt\_BM}$$

$$\Delta w = w_{FRM}(k) - W_{cnt\_BM}$$

The polar angle of $[\Delta v, \Delta w]^T$ is given by $$\theta(k) = \tan^{-1}(\Delta w/\Delta v \cdot vwid/2, wwid/2).$$

(2) From the polar angle, the radial distance of the beam point associated with the same polar angle is generated in accordance with the equation:

$$R(\theta(k)) = \sqrt{(vwid/2 \cdot \cos\theta(k))^2 + (wwid/2 \cdot \sin\theta(k))^2}.$$

(3) If the radial distance of the frame point is less than that of the corresponding beam point, the frame point is within the beam and hence removed from the set of the frame points.

If $\sqrt{\Delta v^2 + \Delta w^2} < R(\theta(k))$, then $k \in \Re_{within\_BM}$ Therefore, $\Re_4 = \Omega_{FRM} - \Re_{within\_BM}$.

In other examples, the beam layout system convert from the antenna pointing vector based on aircraft position in along track and altitude, $at_{AC}$ and h, into the ground coordinate in along-track and cross-track. This process is given below. Let $\bar{e}_{FRM}(k, k \in \Omega_{FRM})$ be the antenna coordinate of the updated frame boundary points, the corresponding to pointing vector in ACD coordinate is $$\bar{r}_{FRM} = T_{uvw\_to\_acd} \bar{e}_{FRM}(k, k \in \Omega_{FRM}), \text{ where}$$

$$R_{s\_FRM} = h/(\bar{r}_{FRM}[0\ 0\ 1]).$$

The ground coordinate of the updated frame points are calculated in accordance with the equations:

$$\bar{at}_{FRM} = at_{AC} + \bar{r}_{FRM}[1\ 0\ 0] \cdot R_{s\_FRM}$$

and $$\bar{ct}_{FRM} = ct_{AC} + \bar{r}_{FRM}[0\ 1\ 0] \cdot R_{s\_FRM}.$$

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for automated layout of beams, the system comprising:
   a boundary position module configured to generate a plurality of boundary positions along boundaries of an image frame; and
   a beam location module configured to determine a start location for a first beam within the plurality of boundary positions based on at least one of a mapping priority, direction of movement of a beam platform, and speed of movement of the beam platform;
   wherein the boundary position module is further configured to modify the plurality of boundary positions based upon the start location.

2. The system of claim 1, further comprising:
   a ground coordinate conversion module configured to convert the starting position into ground coordinates, the ground coordinates indicative of ground relative to a location of an image beam device; and
   a communication module configured to transmit the ground coordinates to the image beam device and receive an image beam from the image beam device.

3. The system of claim 1, further comprising a mapping priority module configured to determine the mapping priority based on at least one of beam size, beam resolution, ground overlap between the boundaries of the image frame and the start location, unspoiled beam size, and spoiled beam size.

4. The system of claim 1, further comprising a mapping priority module configured to determine the mapping priority based on at least one of minimum mapping time, minimum beam layout, highest beam utility, and highest probability of detection.

5. The system of claim 1, wherein the beam platform is an aircraft or a spacecraft.

6. The system of claim 1, wherein each of the plurality of beam locations is a spotlight mode synthetic aperture radar beam.

7. The system of claim 1, wherein the boundary position module is further configured to:
   determine a second location for a second beam within the modified plurality of boundary positions based on at least one of a mapping priority, a direction of movement of a beam platform, and speed of movement of the beam platform; and
   modify the modified plurality of boundary positions based on the second location.

8. A method for automated layout of beams, method comprising:
   (a) generating, by a boundary position module of a beam layout computing system, a plurality of boundary positions along boundaries of an image frame;
   (b) determining, by a beam location module of the beam layout computing system a start location for a first beam within the plurality of boundary positions based on at least one of a mapping priority, direction of movement of a beam platform, and speed of movement of the beam platform;
   (c) modifying, by the boundary position module, the plurality of boundary positions based on the start location;
   (d) determining, by the boundary position module, a second location for a second beam within the modified plurality of boundary positions based on at least one of a mapping priority, direction of movement of a beam platform, and speed of movement of the beam platform; and
   (e) modifying, by the boundary position module, the modified plurality of boundary positions based on the second location.

9. The method of claim 8, further comprising:
   (f) determining, by the boundary position module, if the modified plurality of boundary positions define boundaries of the image frame; and
   (g) repeating steps (d), (e), and (f), by the boundary position module, based on the determination of step (f).

10. The method of claim 8, further comprising:
(f) determining, by the boundary position module, if a target is detected within at least one of the start location and the second location; and
(g) repeating steps (d), (e), and (f), by the boundary position module, based on the determination of step (f).

11. The method of claim 8, further comprising, by a ground coordinate conversion module of the beam layout computing system:
converting the starting position into ground coordinates, the ground coordinates indicative of ground relative to a location of an image beam device;
transmitting the ground coordinates to the image beam device; and
receiving an image beam from the image beam device.

12. The method of claim 8, further comprising, by a mapping priority module of the beam layout computing system, determining the mapping priority based on at least one of beam size, beam resolution, ground overlap between the boundaries of the image frame and the start location, unspoiled beam size, and spoiled beam size.

13. The method of claim 8, further comprising, by a mapping priority module of the beam layout computing system, determining the mapping priority based on at least one of minimum mapping time, minimum beam layout, highest beam utility, and highest probability of detection.

14. A computer program product, tangibly embodied in an information carrier, the computer program product including instructions being operable to cause a data processing apparatus to:
generate a plurality of boundary positions along boundaries of an image frame;
determine a start location for a first beam within the plurality of boundary positions based on at least one of a mapping priority, direction of movement of a beam platform, and speed of movement of the beam platform;
modify the plurality of boundary positions based on the start location;
determine a second location for a second beam within the modified plurality of boundary positions based on at least one of a mapping priority, direction of movement of a beam platform, and speed of movement of the beam platform; and
modify the modified plurality of boundary positions based on the second location.

* * * * *